(12) United States Patent
Fukunaga (10) Patent No.: US 11,781,635 B2
(45) Date of Patent: Oct. 10, 2023

(54) MOTOR UNIT

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 170 days.

(21) Appl. No.: 17/603,964

(22) PCT Filed: Apr. 15, 2020

(86) PCT No.: PCT/JP2020/016586
§ 371 (c)(1),
(2) Date: Oct. 15, 2021

(87) PCT Pub. No.: WO2020/213646
PCT Pub. Date: Oct. 22, 2020

(65) Prior Publication Data
US 2022/0196137 A1    Jun. 23, 2022

(30) Foreign Application Priority Data
Apr. 19, 2019  (JP) .................................. 2019-080431

(51) Int. Cl.
*F16H 57/02* (2012.01)
*F16H 57/021* (2012.01)
(Continued)

(52) U.S. Cl.
CPC ............. *F16H 57/021* (2013.01); *B60K 1/00* (2013.01); *F16C 35/063* (2013.01);
(Continued)

(58) Field of Classification Search
CPC ......... F16H 57/021; F16H 2057/02034; F16H 2057/02052; B60K 1/00; B60K 2001/001;
(Continued)

(56) References Cited

U.S. PATENT DOCUMENTS 9,914,349 B2 *  3/2018  Kuroda ................. F16C 35/067
10,543,742 B2 *  1/2020  Tamura .................. H02K 21/12
(Continued)

FOREIGN PATENT DOCUMENTS

JP            02-254944 A      10/1990
JP          2000310296 A  *  11/2000
(Continued)

OTHER PUBLICATIONS

Official Communication issued in International Patent Application No. PCT/JP2020/016586, dated Jul. 7, 2020.

*Primary Examiner* — Sherry L Estremsky
(74) *Attorney, Agent, or Firm* — KEATING & BENNETT (57) ABSTRACT

A motor assembly includes a first shaft rotatable about a motor axis, a second shaft that extends along the motor axis and is connected to the first shaft on one side in an axial direction of the first shaft to be movable in the axial direction, a first bearing that supports an end at another side in the axial direction of the first shaft, a second bearing that supports an end at one side in the axial direction of the first shaft, a third bearing that supports an end at another side in the axial direction of the second shaft, and a fourth bearing that supports an end at one side in the axial direction of the second shaft. An elastic portion is on a surface opposing another side in the axial direction of the outer ring of the first bearing.

7 Claims, 4 Drawing Sheets

(51) Int. Cl.
*B60K 1/00* (2006.01)
*F16C 35/063* (2006.01)

(52) U.S. Cl.
CPC ............... *B60K 2001/001* (2013.01); *F16H 2057/02034* (2013.01); *F16H 2057/02052* (2013.01)

(58) Field of Classification Search
CPC ....... F16C 35/063; H02K 7/116; H02K 7/083; H02K 5/1732
See application file for complete search history.

(56) References Cited

U.S. PATENT DOCUMENTS

| | | | |
|---|---|---|---|
| 2015/0082929 A1* | 3/2015 | Isomura | F16D 3/68 74/331 |
| 2016/0101808 A1 | 4/2016 | Tomizawa | |
| 2019/0006923 A1* | 1/2019 | Dellal | H02K 9/193 |
| 2019/0173352 A1 | 6/2019 | Yamaguchi et al. | |
| 2020/0336027 A1* | 10/2020 | Takahashi | H02P 21/22 |

FOREIGN PATENT DOCUMENTS

| | | | |
|---|---|---|---|
| JP | 2011-214646 A | | 10/2011 |
| JP | 2020051503 A | * | 4/2020 |

* cited by examiner

MOTOR UNIT

CROSS-REFERENCE TO RELATED APPLICATIONS

This is a U.S. national stage of application No. PCT/JP2020/016586, filed on Apr. 15, 2020, and with priority under 35 U.S.C. § 119(a) and 35 U.S.C. § 365(b) being claimed from Japanese Patent Application No. 2019-080431, filed on Apr. 19, 2019, the entire disclosures of which are hereby incorporated herein by reference.

FIELD OF THE INVENTION

The present disclosure relates to a motor assembly.

BACKGROUND

Generally, in a motor, a rotor shaft is required to be supported with high accuracy in order to decrease a gap between a stator and a rotor to enhance rotation efficiency of the rotor. For this reason, for example, a configuration is known in which both ends of the rotor shaft of the motor are supported by bearings and both ends of a drive shaft to which power is transmitted by the rotor shaft are supported by bearings. In this configuration, the rotor shaft and the drive shaft arranged coaxially are connected to each other by spline coupling.

When the shafts are connected to each other by spline coupling, a load in an axial direction is hardly transmitted between the shafts. This is because a male spline and a female spline slide relative to the load in an axial direction in the spline coupling. However, when the load approaching the other side is applied to one of the shafts during rotation of the shaft, sometimes the load is transmitted to the other shaft due to twisting between the male spline and the female spline, and there is a risk that the large load is applied to the bearing supporting the shaft.

SUMMARY

A motor assembly according to one example embodiment of the present disclosure includes a motor including a first shaft rotatable about a motor axis, a gear portion connected to the motor, and a housing that accommodates the motor and the gear portion. The gear portion includes a second shaft that extends along the motor axis and is connected to the first shaft on one side in an axial direction of the first shaft to be movable in the axial direction with respect to the first shaft, a first helical gear provided on an outer circumferential surface of the second shaft, and a second helical gear that meshes with the first helical gear. The housing includes a first bearing that supports an end at another side in the axial direction of the first shaft, a second bearing that supports an end at one side in the axial direction of the first shaft, a third bearing that supports an end at another side in the axial direction of the second shaft, and a fourth bearing that supports an end at one side in the axial direction of the second shaft. An elastic portion is between an outer ring of the first bearing and an opposite surface of the housing opposite to a surface opposing another side in the axial direction of the outer ring. A gap in the axial direction between the first bearing and the second bearing is larger than a gap in the axial direction between the third bearing and the fourth bearing.

The above and other elements, features, steps, characteristics and advantages of the present disclosure will become more apparent from the following detailed description of the example embodiments with reference to the attached drawings.

DETAILED DESCRIPTION

Hereinafter, motor assemblies according to example embodiments of the present disclosure will be described with reference to the drawings. Note that the scope of the present disclosure is not limited to the following example embodiment described below, but includes any modification thereof within the scope of the technical idea of the present disclosure. Also note that a scale, a number, and the like of a member or a portion illustrated in the following drawings may differ from those of an actual member or a portion, for the sake of easier understanding of the member or the portion. In the drawings, a Y-axis parallel to a width direction (left-right direction) of a vehicle on which the motor assembly is mounted is appropriately illustrated.

Figure 1:
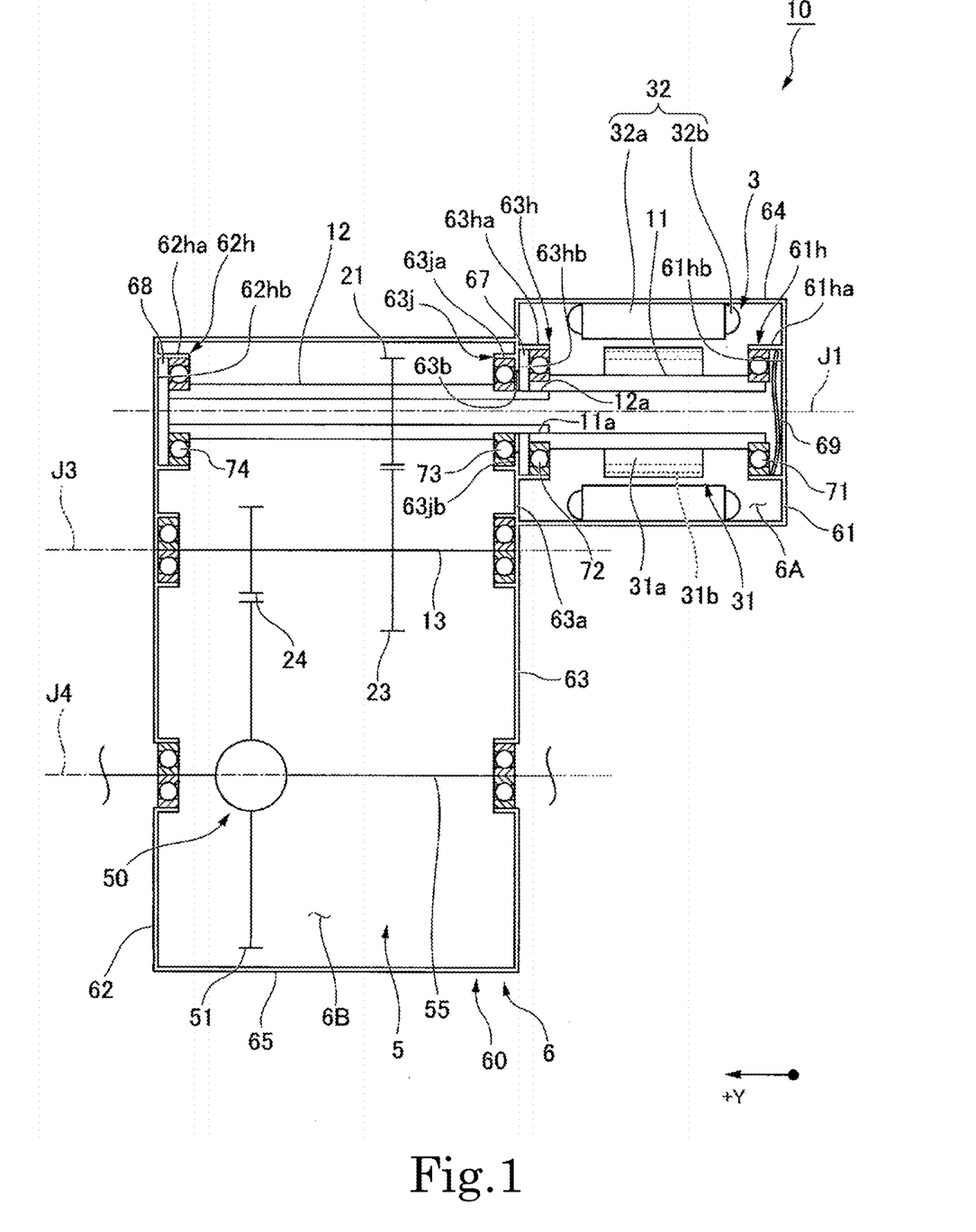
FIG. 1 is a conceptual diagram illustrating a motor assembly according to an example embodiment of the present disclosure.
Figure 2:
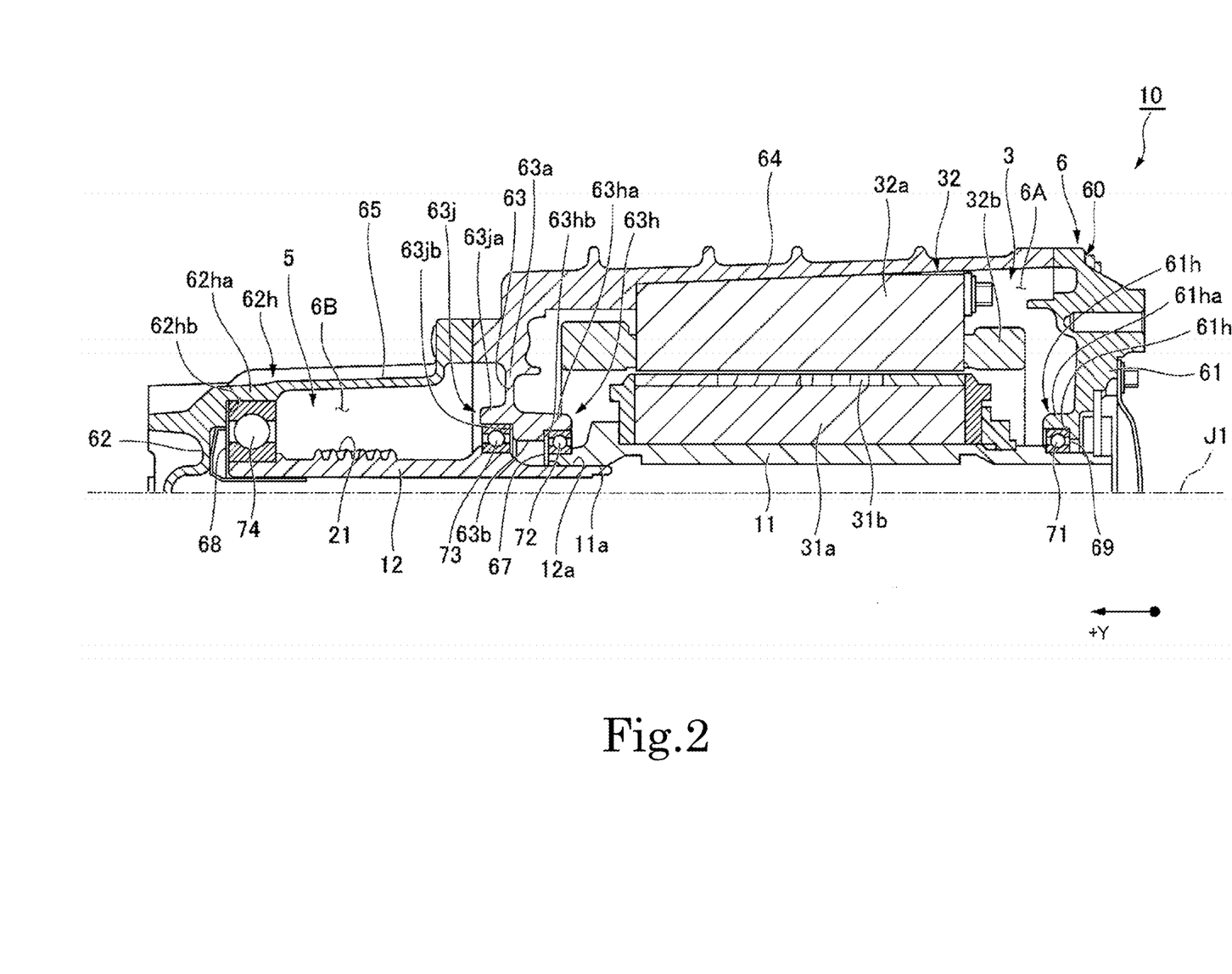
FIG. 2 is a sectional view illustrating a motor assembly of an example embodiment of the present disclosure.
Figure 3:
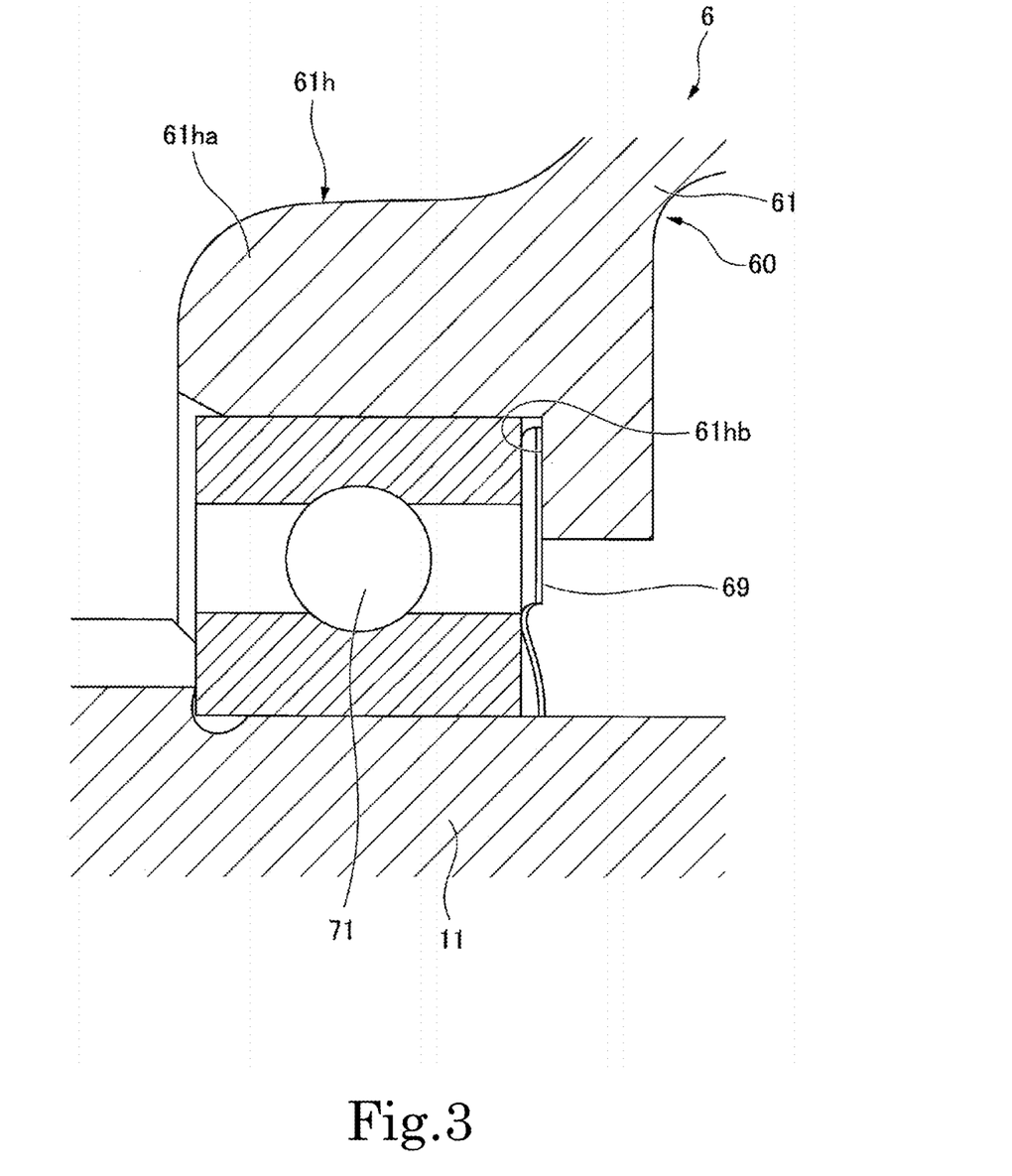
FIG. 3 is a partially enlarged view of FIG. 2.
Figure 4:
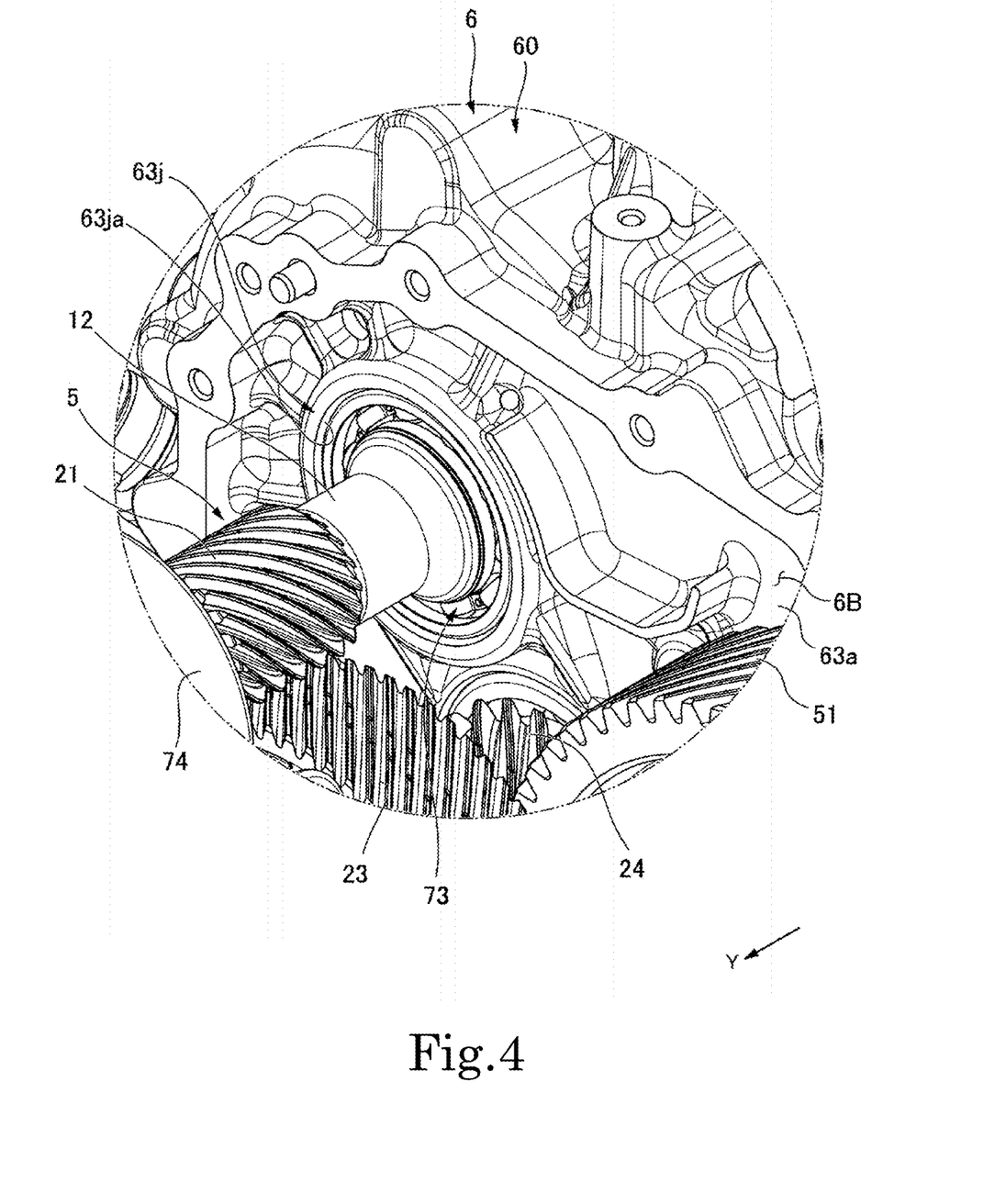
FIG. 4 is a perspective view illustrating a vicinity of a second shaft of a motor assembly according to an example embodiment of the present disclosure.

FIG. 1 is a conceptual diagram illustrating a motor assembly 10 of the example embodiment. FIG. 2 is a sectional view of the motor assembly 10. FIG. 3 is a partially enlarged view of FIG. 2 in a vicinity of a first bearing 71. FIG. 4 is a perspective view illustrating the vicinity of a second shaft of the motor assembly 10.

A motor axis J1, a counter axis J3, and an output axis J4, which are described later, are virtual axes that do not actually exist. The motor axis J1, the counter axis J3, and the output axis J4 are parallel to one another, and extend along a Y-axis direction.

In the following description, unless otherwise specified, a direction (Y-axis direction) parallel to the motor axis J1 will be simply referred to as an "axial direction", a radial directions centered on the motor axis J1 will be simply referred to as a "radial direction", and a circumferential direction centered on the motor axis J1, namely, a circumferential direction about the motor axis J1 will be simply referred to as a "circumferential direction". In the description, a +Y-direction of both sides in an axial direction along the motor axis J1 is referred to as one side in the axial direction, and the −Y-direction is referred to as the other side in the axial direction.

The motor assembly 10 is mounted on a vehicle, and drives the vehicle by rotating wheels mounted on the vehicle. For example, the motor assembly 10 is mounted on an electric vehicle (EV). The motor assembly 10 only has to be mounted on a vehicle, such as a hybrid vehicle (HEV) and a plug-in hybrid vehicle (PHV), in which a motor is used as a power source.

As illustrated in FIG. 1, the motor assembly 10 includes a motor 3, a gear portion 5, and a housing 6 that accommodates the motor 3 and the gear portion 5.

The motor 3 is a motor generator that has both a function as a drive device and a function as a power generation device. The motor 3 mainly functions as a drive device to drive the vehicle, and functions as a power generation device during regeneration.

The motor 3 is an inner rotor type motor. The motor 3 includes a rotor 31 and a stator 32 that surrounds the rotor 31 from a radially outside.

The rotor 31 rotates about the motor axis J1 when electric power is supplied from a battery (not illustrated) to the stator 32. The rotor 31 includes a first shaft 11, a rotor core 31a, and the rotor magnet 31b.

The first shaft 11 extends along the motor axis J1. The first shaft 11 rotates about the motor axis J1. A hollow portion extending along the motor axis J1 and opening at both ends in the axial direction is provided inside the first shaft 11.

A female spline 11a is provided at an end at one side (+Y-side) in the axial direction of the first shaft 11. The female spline 11a includes a convex portion and a concave portion arranged along the circumferential direction on an inner circumferential surface of the hollow portion.

The rotor core 31a is a columnar body extending along the axial direction. The rotor core 31a is fixed to the first shaft 11. Each rotor magnet 31b is a permanent magnet. The rotor magnet 31b is fixed to the rotor core 31a.

The stator 32 includes a stator core 32a and a coil 32b. The stator 32 is held by the housing 6. The stator core 32a includes a plurality of magnetic pole teeth (not illustrated) from an inner circumferential surface of an annular yoke to a radial inside. The coil 32b is constructed by winding a coil wire between the magnetic pole teeth.

The gear portion 5 is located at one side (+Y-side) in the axial direction with respect to the motor 3. The gear portion 5 is connected to the motor 3, transmits the power of the motor 3, and outputs the power from an output shaft 55. The gear portion 5 incorporates a plurality of mechanisms that are responsible for power transmission between a drive source and a driven device.

The gear portion 5 includes a second shaft 12, a pinion gear (first helical gear) 21, a counter shaft 13, a counter gear (second helical gear) 23, a drive gear 24, a ring gear 51, the output shaft 55, and a differential 50.

The second shaft 12 extends along the motor axis J1. The first shaft 11 and the second shaft 12 are coaxially disposed. The end at the other side (−Y-side) in the axial direction of the second shaft 12 is connected to the first shaft 11. That is, the second shaft 12 is connected to the first shaft 11 at one side (+Y-side) in the axial direction of the first shaft 11. The second shaft 12 rotates around the motor axis J1 together with the first shaft 11.

A hollow portion extending along the motor axis J1 and opening at both ends in the axial direction is provided inside the second shaft 12. When the second shaft 12 is connected to the first shaft 11, the hollow portions of the second shaft 12 and the first shaft 11 communicate with each other. Oil cooling the motor 3 passes through the communicated hollow portions.

A male spline 12a is provided at the end at the other side (−Y-side) in the axial direction of the second shaft 12. The male spline 12a includes a convex portion and a concave portion arranged along the circumferential direction on an outer circumferential surface of the second shaft 12. The end at the other side (−Y-side) in the axial direction of the second shaft 12 is inserted into the hollow portion of the end at one side (+Y-side) in the axial direction of the first shaft 11. Thus, the female spline 11a of the first shaft 11 and the male spline 12a of the second shaft 12 are fitted to each other, and the first shaft 11 and the second shaft 12 are connected to each other.

The pinion gear 21 is provided on the outer circumferential surface of the second shaft 12 of the motor 3. The pinion gear 21 rotates about the motor axis J1 together with the second shaft 12. The pinion gear 21 is a helical gear.

The counter shaft 13 extends along the counter axis J3 parallel to the motor axis J1. The counter shaft 13 rotates about the counter axis J3.

The counter gear 23 and the drive gear 24 are provided on the outer circumferential surface of the counter shaft 13. The counter gear 23 and the drive gear 24 are connected to each other through a counter shaft 13. The counter gear 23 and the drive gear 24 rotate about the counter axis J3. The counter gear 23 is a helical gear. The counter gear 23 meshes with the pinion gear 21. The drive gear 24 meshes with the ring gear 51 of the differential 50.

The ring gear 51 is fixed to the differential 50. The ring gear 51 meshes with the drive gear 24 and rotates about the output axis J4 parallel to the motor axis J1. The ring gear 51 transmits the power of the motor 3 transmitted through the drive gear 24 to the differential 50.

The differential 50 is a device that transfers torque outputted from the motor 3 to wheels of the vehicle. The differential 50 is connected to a pair of output shafts 55. The wheel is attached to each of the pair of output shafts 55. The differential 50 has a function of transferring the same torque to the pair of output shafts 55 while absorbing a difference in speed between the left and right wheels during turning the vehicle.

As illustrated in FIG. 4, the pinion gear 21 and the counter gear 23 meshing with each other are helical gears. Similarly, the drive gear 24 and the ring gear 51 meshing with each other are helical gears As illustrated in FIG. 1, the housing 6 accommodates the motor 3 and the gear portion 5. The housing 6 includes a housing body 60, a first bearing 71, a second bearing 72, a third bearing 73, and a fourth bearing 74.

The first bearing 71, the second bearing 72, the third bearing 73, and the fourth bearing 74 are arranged side by side on the motor axis J1. The first bearing 71, the second bearing 72, the third bearing 73, and the fourth bearing 74 are arranged in this order from the other side (−Y-side) toward one side (+Y-side) in the axial direction.

The first bearing 71 and the second bearing 72 support both ends of the first shaft 11. More specifically, the first bearing 71 supports the end at the other side (−Y-side) in the axial direction of the first shaft 11, and the second bearing 72 supports the end at one side (+Y-side) in the axial direction of the first shaft 11.

The third bearing 73 and the fourth bearing 74 support both ends of the second shaft 12. More specifically, the third bearing 73 supports the end at the other side (−Y-side) in the axial direction of the second shaft 12, and the fourth bearing 74 supports the end at one side (+Y-side) in the axial direction of the second shaft 12.

The housing body 60 includes a first wall portion 61, a second wall portion 62, an intermediate wall portion 63, a motor surrounding portion 64, and a gear surrounding portion 65. The first wall portion 61, the second wall portion 62, and the intermediate wall portion 63 extend along a plane orthogonal to the motor axis J1.

The first wall portion 61 covers the motor 3 from the other side (−Y-side) in the axial direction. A first bearing holding portion 61h is provided on a surface facing one side (+Y-side) in the axial direction of the first wall portion 61. The first bearing holding portion 61h holds an outer ring of the first bearing 71.

The second wall portion 62 covers the gear portion 5 from one side (+Y-side) in the axial direction. A fourth bearing holding portion 62h is provided on the surface facing the other side (−Y-side) in the axial direction of the second wall portion 62. The fourth bearing holding portion 62h holds the outer ring of the fourth bearing 74.

In the axial direction, the intermediate wall portion 63 is located between the first wall portion 61 and the second wall portion 62. The intermediate wall portion 63 covers the motor 3 from one side (+Y-side) in the axial direction and covers the gear portion 5 from the other side (−Y-side) in the axial direction.

A part of the intermediate wall portion 63 functions as a partition wall 63a that partitions an internal space of the housing body 60 into a motor chamber 6A and a gear chamber 6B. The motor chamber 6A accommodates the motor 3. The gear chamber 6B accommodates the gear portion 5.

An insertion hole 63b penetrating in the axial direction is made in the partition wall 63a. The insertion hole 63b connects the motor chamber 6A and the gear chamber 6B. The end at the other side (−Y-side) in the axial direction of the second shaft 12 is inserted into the insertion hole 63b.

The second bearing holding portion 63h is provided on the surface facing the other side (−Y-side) in the axial direction of the partition wall 63a. A third bearing holding portion 63j is provided on the surface facing one side (+−Y-side) in the axial direction of the partition wall 63a. The second bearing holding portion 63h holds the outer ring of the second bearing 72. The third bearing holding portion 63j holds the outer ring of the third bearing 73.

The motor surrounding portion 64 surrounds the motor 3 from radially outside. The motor surrounding portion 64 connects the first wall portion 61 and the intermediate wall portion 63. The gear surrounding portion 65 surrounds the gear portion 5 from radially outside. The gear surrounding portion 65 connects the second wall portion 62 and the intermediate wall portion 63.

A holding structures of the first bearing 71, the second bearing 72, the third bearing 73, and the fourth bearing 74 will be specifically described below with reference to FIGS. 2 and 3.

As illustrated in FIG. 3, the first bearing holding portion 61h that holds the first bearing 71 includes a first tubular portion 61ha and a first opposite surface (opposite surface) 61hb. The first tubular portion 61ha has a tubular shape centered on the motor axis J1, and surrounds the first bearing 71 from radially outside. The first opposite surface 61hb is a surface facing one side (+Y-side) in the axial direction located inside the first tubular portion 61ha. The first opposite surface 61hb is opposite to the surface facing the other side (−Y-side) in the axial direction of the outer ring of the first bearing 71. A wave washer (elastic portion) 69 is disposed between the outer ring of the first bearing and the first opposite surface 61hb. A coil spring, rubber, or the like may be disposed as another example of the elastic portion.

As illustrated in FIG. 2, the second bearing holding portion 63h that holds the second bearing 72 includes a second tubular portion 63ha and a second opposite surface 63hb. The second tubular portion 63ha has a tubular shape centered on the motor axis J1 and surrounds the second bearing 72 from radially outside. The second opposite surface 63hb is a surface facing the other axial side (−Y-side) located inside the second tubular portion 63ha. The second opposite surface 63hb faces a surface facing one side (+Y-side) in the axial direction of the outer ring of the second bearing 72. A first gap adjustment shim 67 is disposed between the outer ring of the second bearing and the second opposite surface 63hb.

In both ends of the first shaft 11, outer diameters of portions into which the first bearing 71 and the second bearing 72 are inserted are small. For this reason, step surfaces facing a distal end side are provided at both ends of the first shaft 11. Inner rings of the first bearing 71 and the second bearing 72 are in contact with step surfaces at both ends of the first shaft 11. The outer ring of the first bearing 71 is opposite to the first opposite surface 61hb in the axial direction. A wave washer 69 is sandwiched between the outer ring of the first bearing 71 and the first opposite surface 61hb. The outer ring of the second bearing 72 is opposite to the second opposite surface 63hb in the axial direction. The first gap adjustment shim 67 is sandwiched between the second bearing 72 and the second opposite surface 63hb. The direction of a preload to the first bearing 71 and the second bearing 72 is a front surface combination direction. The first gap adjustment shim 67 may be sandwiched between the first bearing 71 and the first opposite surface 61hb instead of between the second bearing 72 and the second opposite surface 61hb.

The bearing assembled by a fixed-position preload method is fixed in a state where the outer ring is axially shifted with respect to the inner ring according to a dimension measured in advance. Thus, rattling of the outer ring with respect to the inner ring can be prevented, and accuracy of a rotation support can be enhanced. In this case, when a gap between the inner ring and the outer ring with respect to a steel ball is set to zero, the load applied to the steel ball increases due to expansion caused by heat generation during use, and there is a possibility that a life of the bearing is significantly reduced. For this reason, when the preload at a fixed position is applied to the bearing, the inner ring and the outer ring are assembled in a state where a slight gap is provided in a relationship among the inner ring, the steel ball, and the outer ring. In the assembled bearing, the outer ring is movable in the axial direction with respect to the inner ring by the gap. In the description, the gap is referred to as a remaining gap. In other words, the outer ring is allowed to move by the remaining gap with respect to the inner ring.

The preload is applied to the first bearing 71 and the second bearing 72 by the fixed-position preload method. The remaining gap between the first bearing 71 and the second bearing 72 is adjusted by a thickness of the first gap adjustment shim 67. A wave washer 69 is sandwiched between the outer ring of the first bearing 71 and the first opposite surface 61hb. The wave washer 69 is in contact with the outer ring of the first bearing 71 and the first opposite surface 61hb. For this reason, in the first bearing 71, the outer ring is movable to one side in the axial direction with respect to the inner ring by a compression margin of the wave washer 69. That is, the remaining gap of the first bearing 71 is matched with the compression margin of the wave washer 69. The outer ring of the second bearing 72 is movable in the axial direction with respect to the inner ring by the same amount as the first bearing 71. Consequently, the remaining gap in the axial direction of the first bearing 71 and the remaining gap in the axial direction of the second bearing 72 have substantially the same dimension. As described later, the remaining gap in the axial direction between the first bearing 71 and the second bearing 72 is preferably larger than the remaining gap in the axial direction between the third bearing 73 and the fourth bearing 74.

The third bearing holding portion 63*j* that holds the third bearing 73 includes a third tubular portion 63*ja* and a third opposite surface 63*jb*. The third tubular portion 63*ja* has a tubular shape centered on the motor axis J1 and surrounds the third bearing 73 from the radial outside. The third opposite surface 63*jb* is the surface facing one side (+Y-side) in the axial direction located inside the third tubular portion 63*ja*. The third opposite surface 63*jb* is opposite to the surface of the third bearing 73 facing the other side (−Y-side) in the axial direction of the outer ring. The outer ring of the third bearing and the third opposite surface 63*jb* are in direct contact with each other.

The fourth bearing holding portion 62*h* that holds the fourth bearing 74 includes a fourth tubular portion 62*ha* and a fourth opposite surface 62*hb*. The fourth tubular portion 62*ha* has a tubular shape centered on the motor axis J1 and surrounds the fourth bearing 74 from radially outside. The fourth opposite surface 62*hb* is a surface facing the other side (−Y-side) in the axial direction located inside the fourth tubular portion 62*ha*. The fourth opposite surface 62*hb* is opposite to the surface of the fourth bearing 74 facing one side (+Y-side) in the axial direction of the outer ring. A second gap adjustment shim 68 is disposed between the outer ring of the fourth bearing and the fourth opposite surface 62*hb*.

In both ends of the second shaft 12, the outer diameters of portions into which the third bearing 73 and the fourth bearing 74 are inserted are small. For this reason, step surfaces facing the distal end side are provided at both ends of the second shaft 12. The inner rings of the third bearing 73 and the fourth bearing 74 are in contact with the stepped surfaces at both ends of the second shaft 12. The outer ring of the third bearing 73 is opposite to the third opposite surface 63*jb* in the axial direction. The outer ring of the third bearing 73 and the third opposite surface 63*jb* are in direct contact with each other. The outer ring of the fourth bearing 74 is opposite to the fourth opposite surface 62*hb* in the axial direction. The second gap adjustment shim 68 is sandwiched between the fourth bearing 74 and the fourth opposite surface 62*hb*. The direction of the preload to the third bearing and the fourth bearing 74 is a front surface combination direction.

The preload is applied to the third bearing 73 and the fourth bearing 74 by the fixed-position preload method. The remaining gap between the third bearing 73 and the fourth bearing 74 is adjusted by the thickness of the second gap adjustment shim 68. The remaining gap in the axial direction of the third bearing 73 and the remaining gap in the axial direction of the fourth bearing 74 have substantially the same dimension. The second gap adjustment shim 68 may be sandwiched between the third bearing 73 and the third opposite surface 63*jb* instead of between the fourth bearing 74 and the fourth opposite surface 62*hb*.

As described above, the motor 3 has both the function as the drive device and the function as the power generation device. In the following description, a state in which the motor 3 drives the vehicle as the drive device is referred to as a drive mode, and a state in which the motor 3 generates the power as the power generation device is referred to as a regeneration mode.

When the motor 3 is in the drive mode, the torque in the same direction (forward rotation direction) as the rotation direction is applied to each shaft and each gear. When the motor is in the regeneration mode, the motor 3 functions as a regenerative brake that decelerates the rotation of the wheels. For this reason, the torque in an opposite direction (reverse rotation direction) to the rotation direction is applied to each shaft and each gear.

As described above, the pinion gear 21 provided on the outer circumferential surface of the second shaft 12 and the counter gear 23 meshing with the pinion gear 21 are helical gears. For this reason, stress on one side or the other side in the axial direction is applied to the second shaft 12 according to the direction in which the torque is applied. At the moment when the motor 3 transitions from the drive mode to the regeneration mode or from the regeneration mode to the drive mode, the stress is applied to the second shaft 12 on the opposite side in the axial direction. The second shaft moves in the axial direction by the remaining gap between the third bearing 73 and the fourth bearing 74 by the transition of the mode of the motor 3. In the example embodiment, desirably the stress is applied in one side (+Y side) direction in the axial direction in the drive mode, and an inclination directions of the teeth of the first helical gear and the second helical gear are configured such that stress is applied in one side in the axial direction in the drive mode.

According to the example embodiment, the first shaft 11 and the second shaft 12 are connected to each other by spline coupling. Accordingly, even when the second shaft 12 moves in the axial direction with the transition of the mode of the motor 3, the movement in the axial direction of the first shaft 11 is prevented by the sliding of the male spline 12*a* and the female spline 11*a* in the axial direction. As a result, the application of the large load in the axial direction to the first bearing 71 and the second bearing 72 that hold the first shaft 11 can be prevented, and the small bearing having the small load can be adopted as the first bearing 71 and the second bearing 72. In other words, the outer diameters of the third bearing 73 and the fourth bearing 74 are larger than the outer diameters of the first bearing 71 and the second bearing 72.

However, the inventors have found that when the second shaft 12 moves to the other side (−Y-side) in the axial direction in a state where the first shaft 11 and the second shaft 12 rotate, the load on the other side (−Y side) in the axial direction may be transmitted to the first shaft 11 by the male spline 12*a* and the female spline 11*a* twisting.

According to the example embodiment, the wave washer 69 as the elastic portion is disposed between the outer ring of the first bearing 71 and the first opposite surface 61*hb* of the housing 6. Accordingly, even when the load on the other side (−Y-side) in the axial direction is applied from the second shaft 12 to the first shaft 11 with the transition of the mode of the motor 3, the application of the large load to the first bearing 71 can be prevented. More specifically, when the first shaft 11 moves to the other side (−Y-side) in the axial direction by the load from the second shaft 12, the wave washer 69 is compressed, so that the load applied to the steel ball of the first bearing 71 can be limited. Thus, the first bearing 71 can be protected, and reliability of rotational support of the first shaft 11 by the first bearing 71 and the second bearing 72 can be enhanced.

At this point, the outer diameter of the fourth bearing 74 is larger than the outer diameters of the first bearing 71 and the second bearing 72. Furthermore, the outer diameter of the fourth bearing 74 is larger than the outer diameter of the third bearing 73. By enlarging the diameter of the fourth bearing 74, namely, making the bearing that can withstand the high torque, even when the stress is applied to one side (+Y side) in the axial direction, the necessity of the provision of the elastic portion is eliminated on the side of the fourth bearing 74. Consequently, the number of components can be reduced. Furthermore, the diameters of the first bearing 71, the second bearing 72, and the third bearing 73 can be made relatively small by making the diameter of only the fourth bearing 74 larger than the diameters of the first bearing 71, the second bearing 72, and the third bearing 73. Thus, rolling resistance of the bearing can be suppressed low. In addition, the entire motor assembly can be downsized because the first bearing 71, the second bearing 72, and the third bearing 73 are downsized.

When the male spline 12*a* moves in the direction in which the male spline 12*a* comes out of the female spline 11*a*, the spline connection is hardly twisted. That is, when the second shaft 12 moves to one side (+Y-side) in the axial direction with the transition of the mode of the motor 3, the male spline 12*a* and the female spline 11*a* slide smoothly in the axial direction. For this reason, the load associated with the transition of the mode of the motor 3 is hardly applied to the second bearing 72. In the example embodiment, the wave washer is not disposed between the outer ring of the second bearing 72 and the second opposite surface 63*hb*. Consequently, the number of components can be decreased to simplify the assembly process.

In the example embodiment, the first shaft 11 and the second shaft 12 are connected to each other by spline coupling. Consequently, the first shaft 11 and the second shaft 12 are relatively movable in the axial direction, and the load on the first shaft 11 is hardly transmitted to the second shaft 12. In the description, the spline coupling means a configuration in which a shaft provided with a plurality of grooves on the outer circumferential surface and a hole having a shape corresponding to the shaft are combined and connected to each other.

The connection structure between the first shaft 11 and the second shaft 12 is not limited to the example embodiment. The first shaft 11 and the second shaft 12 only have to be connected to each other so as to be relatively movable in the axial direction. The first shaft 11 and the second shaft 12 only have to be connected to each other while the surfaces of the first shaft 11 and the second shaft 12 facing the circumferential direction are opposite to each other. A structure, in which grooves are provided on the outer circumferential surface of the shaft and the inner circumferential surface of the hole and the shaft and the hole are connected to each other by keys fitted in the grooves, can be exemplified in addition to the example embodiment as such a connection structure.

According to the example embodiment, the elastic portion disposed between the outer ring of the first bearing 71 and the first opposite surface 61*hb* of the housing 6 is the wave washer 69. For this reason, the elastic portion can be interposed between the outer ring of the first bearing 71 and the first opposite surface 61*hb* of the housing 6 in an easy assembly process.

In the example embodiment, the remaining gap in the axial direction of the first bearing 71 and the second bearing 72 is preferably larger than the residual gap in the axial direction of the third bearing 73 and the fourth bearing 74. As described above, the second shaft 12 moves in the axial direction by the remaining gap between the third bearing 73 and the fourth bearing 74 by the transition of the mode of the motor 3. The wave washer 69 is compressed when the first shaft 11 moves in the axial direction together with the second shaft 12 due to the transition of the mode of the motor 3. At this point, as described above, the compression margin of the wave washer 69 is matched with the remaining gap of the first bearing 71. According to the example embodiment, because the remaining gap in the axial direction between the third bearing 73 and the fourth bearing 74 is smaller than the remaining gap between the first bearing 71 and the second bearing 72, the amount of movement of the second shaft 12 is smaller than the compression margin of the wave washer 69 that is the remaining gap of the first bearing 71. Therefore, the amount of movement of the first shaft 11 is smaller than the remaining gap between the first bearing and the second bearing. Consequently, the wave washer 69 is not completely compressed, and the application of an excessive load to the first bearing 71 and the second bearing 72 can be prevented.

While the example embodiment of the present disclosure and the modifications thereof have been described above, it will be understood that features, a combination of the features, and so on according to each of the example embodiment and the modifications thereof are only illustrative and not restrictive, and that an addition, elimination, and substitution of a feature(s), and other modifications can be made without departing from the scope and spirit of the present disclosure. The present disclosure is not limited to the example embodiment.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly comprising:
 a motor including a first shaft rotatable about a motor axis;
 a gear portion connected to the motor; and
 a housing that accommodates the motor and the gear portion; wherein
 the gear portion includes:
  a second shaft that extends along the motor axis and is connected to the first shaft on one side in an axial direction of the first shaft to be movable in the axial direction with respect to the first shaft;
  a first helical gear provided on an outer circumferential surface of the second shaft; and
  a second helical gear that meshes with the first helical gear;
 the housing includes:
  a first bearing that supports an end at another side in the axial direction of the first shaft;
  a second bearing that supports an end at one side in the axial direction of the first shaft;
  a third bearing that supports an end at another side in the axial direction of the second shaft; and
  a fourth bearing that supports an end at one side in the axial direction of the second shaft;
 an elastic portion is between an outer ring of the first bearing and an opposite surface of the housing opposite to a surface opposing another side in the axial direction of the outer ring; and
 a gap in the axial direction between the first bearing and the second bearing is larger than a gap in the axial direction between the third bearing and the fourth bearing.

2. The motor assembly according to claim 1, wherein the elastic portion includes a wave washer.

3. The motor assembly according to claim 1, wherein the gear portion includes:
 a counter shaft extending along a counter axis parallel to the motor axis;

the second helical gear and a drive gear that are provided on an outer circumferential surface of the counter shaft;

a differential including a ring gear meshing with the drive gear to rotate about an output shaft parallel to a motor shaft; and a pair of output shafts connected to the differential.

4. The motor assembly according to claim 1, wherein a preload is applied to the first bearing, the second bearing, the third bearing, and the fourth bearing by a fixed-position preload method.

5. The motor assembly according to claim 1, wherein the housing includes:

a first opposite surface opposite to the another side in the axial direction of the outer ring of the first bearing in a first bearing holding portion that holds the first bearing;

a second opposite surface opposite to one side in an axial direction of an outer ring of the second bearing in a second bearing holding portion that holds the second bearing;

a third opposite surface opposing the another side in the axial direction of an outer ring of the third bearing in a third bearing holding portion that holds the third bearing; and a fourth opposite surface opposing one side in an axial direction of an outer ring of the fourth bearing in a fourth bearing holding portion that holds the fourth bearing; and the elastic portion is sandwiched between the outer ring of the first bearing and the first opposite surface.

6. The motor assembly according to claim 5, wherein a shim is sandwiched between the outer ring of the second bearing and the second opposite surface;

the outer ring of the third bearing is in direct contact with the third opposite surface;

a shim is sandwiched between the outer ring of the fourth bearing and the fourth opposite surface;

an inner ring of the first bearing and an inner ring of the second bearing are in contact with a step surface provided on the first shaft; and an inner ring of the third bearing and an inner ring of the fourth bearing are in contact with a step surface provided on the second shaft.

7. The motor assembly according to claim 1, wherein an outer diameter of the fourth bearing is larger than outer diameters of the first bearing, the second bearing, and the third bearing.

\* \* \* \* \*